United States Patent [19]

Lee et al.

[11] Patent Number: 5,736,075
[45] Date of Patent: Apr. 7, 1998

[54] METHOD OF FORMING A MOLDED PRODUCT USING A FREEZING STEP

[75] Inventors: James S. W. Lee, Long Island, N.Y.; Kwong-Wai Chow, Hunghom, Hong Kong

[73] Assignee: C.J. Associates, Ltd., Kowloon, Hong Kong

[21] Appl. No.: 734,900

[22] Filed: Oct. 22, 1996

[51] Int. Cl.⁶ .................................................. B29C 67/20
[52] U.S. Cl. .................. 264/28; 264/45.5; 264/321
[58] Field of Search ................. 264/28, 321, 46.4, 264/45.5

[56] References Cited

U.S. PATENT DOCUMENTS

| | | | |
|---|---|---|---|
| 3,504,064 | 3/1970 | Bauer | 264/28 |
| 3,551,536 | 12/1970 | Guerreiro | 264/28 |
| 3,959,545 | 5/1976 | Siedenstrang | 264/28 |
| 4,253,897 | 3/1981 | Pistone . | |
| 4,273,816 | 6/1981 | Tollette . | |
| 4,284,443 | 8/1981 | Hilton . | |
| 4,364,880 | 12/1982 | Howse . | |
| 4,472,131 | 9/1984 | Ryder . | |
| 4,657,715 | 4/1987 | Myers et al. | 264/45.5 |
| 4,800,126 | 1/1989 | Leonardi . | |
| 4,931,232 | 6/1990 | Lermuzeaux et al. . | |
| 4,960,558 | 10/1990 | Short . | |
| 5,308,557 | 5/1994 | Addeo et al. | 264/28 |
| 5,336,675 | 8/1994 | Needham . | |
| 5,350,544 | 9/1994 | Bambara et al. | 264/321 |
| 5,364,696 | 11/1994 | Wagner . | |
| 5,376,197 | 12/1994 | Schaupert . | |
| 5,396,675 | 3/1995 | Vincent et al. . | |
| 5,422,050 | 6/1995 | Graiver et al. . | |
| 5,424,119 | 6/1995 | Phillips et al. . | |
| 5,494,633 | 2/1996 | Oblander et al. | 264/28 |

FOREIGN PATENT DOCUMENTS

| | | | |
|---|---|---|---|
| 7208787 | 1/1973 | Netherlands | 264/28 |

*Primary Examiner*—Allan R. Kuhns
*Attorney, Agent, or Firm*—Laff, Whitesel, Conte & Saret, Ltd.

[57] ABSTRACT

A method of molding, from porous material, a low-density product having an impermeable surface. A mold is provided, which has a cavity, the outline of which defines the outline of the product. The starting material is a flat sheet of plastic foam. The first step of the process, in some cases, is a pre-heating procedure, which softens the material. Then, from this sheet there is stamped a blank having substantially the outline of the desired product, which is then inserted into the mold cavity. The mold is then heated with the blank therein to form the blank permanently into the desired product, after which the mold is quenched in cold water with the product still inside. The product is subsequently removed from the mold and frozen. The result of this molding method is a low-density product having an impermeable surface integral with the foam interior which is suitable for receiving various types of brightly colored finished. It is also contemplated that a non-porous plastic film may be molded in place on the surface of the product.

11 Claims, 4 Drawing Sheets

5,736,075

METHOD OF FORMING A MOLDED PRODUCT USING A FREEZING STEP

TECHNICAL FIELD

This invention relates generally to molded objects and methods of molding. It particularly concerns an object molded of foam material which has many of the characteristics of a solid molded object, and molding methods for achieving such characteristics.

BACKGROUND OF THE INVENTION

Toys and other objects which are fabricated from porous materials such as foamed plastics have certain advantages: they are light in weight, owing to their low density; and they are safe for children, owing to their compressibility. Such lightness, safety and compressibility makes these materials especially suitable for bouncing balls, flying toys such as gliders, and throw-toys such as darts. But these materials have not generally produced very good results when used for other types of toys and other products.

In the past it has been difficult or impossible to fabricate such materials in a form which is acceptable to the marketplace. Foam materials are usually supplied in sheet form, making it difficult to fabricate them into objects of non-uniform thickness. By comparison, injection-molded plastic objects can be made in a wide variety of shapes of non-uniform thickness. Injection molding also has been favored for the inclusion of molded-in-place inserts of various types. Historically, foam materials have not held such inserts well.

In addition, the toy marketplace favors objects with a shiny surface, preferably decorated with a variety of bright colors. Foam materials have heretofore had a dull, porous surface which is unsuitable for finishing with brightly colored paints, silk screens, tampo printing and decals. Such surfaces are also unsuitable for the molding of fine surface detail, which lends a desirable realism to toy objects. Another problem encountered with foam objects of the prior art is their vulnerability to tearing because of the softness of the surface layer.

The present invention, however, contemplates the molding of toys and other objects from foam materials, yet provides such objects with a tough, smooth, shiny surface which is similar to that which results from insert molding. As a result, the molded foam objects of this invention combine foam's advantages of lightness, safety and compressibility with a superior ability to hold molded-in-place inserts and to accept various types of surface decorations, preferably brightly colored, plus fine surface detail. The molded foam objects of the invention are also more durable, because the tough surface layer resists tearing.

BRIEF SUMMARY OF THE INVENTION

These desirable results are achieved by a method of molding a low-density object having an impermeable surface, from porous material, comprising the steps of preparing a mold having a cavity the outline of which defines the outline of the object, stamping from the porous material a blank having substantially the outline of the object, inserting the blank into the cavity with the outline of the blank substantially congruent with the outline of the cavity, heating the mold with the blank therein to form the blank permanently into a product, and then removing from the mold and freezing the product, the durations and temperatures of the heating and freezing steps being chosen such that an impermeable surface is permanently formed on the product, whereby the product has the appearance of having been formed from non-porous material.

In a most preferred form of the invention, after heating the mold is quenched in cold water, after which the molded product is removed and subjected to freezing.

The result of this molding method is a low-density product having an impermeable surface and a foam interior integral with the impermeable surface.

DETAILED DESCRIPTION OF THE PREFERRED EMBODIMENTS

Figure 1:
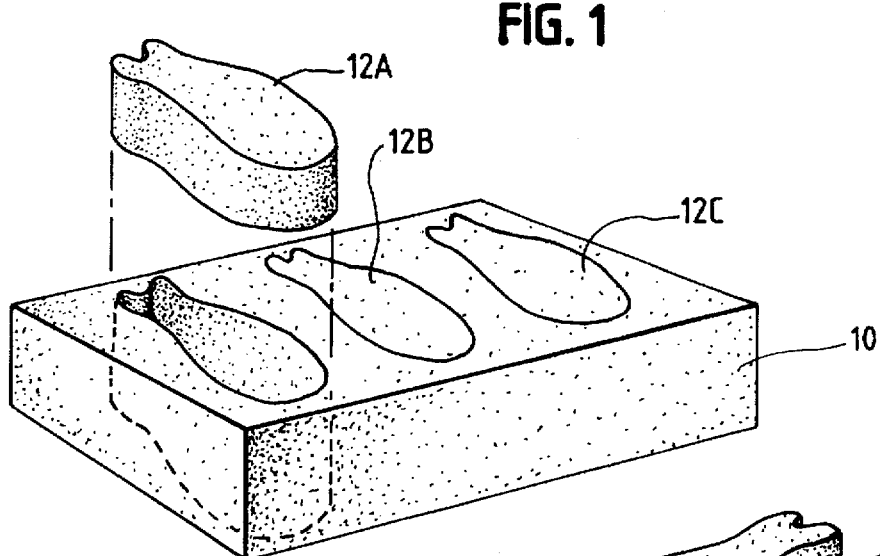
FIG. 1 is an exploded perspective view of a sheet of foam plastic material, from which a number of mold blanks have been cut and removed.
Figure 2:
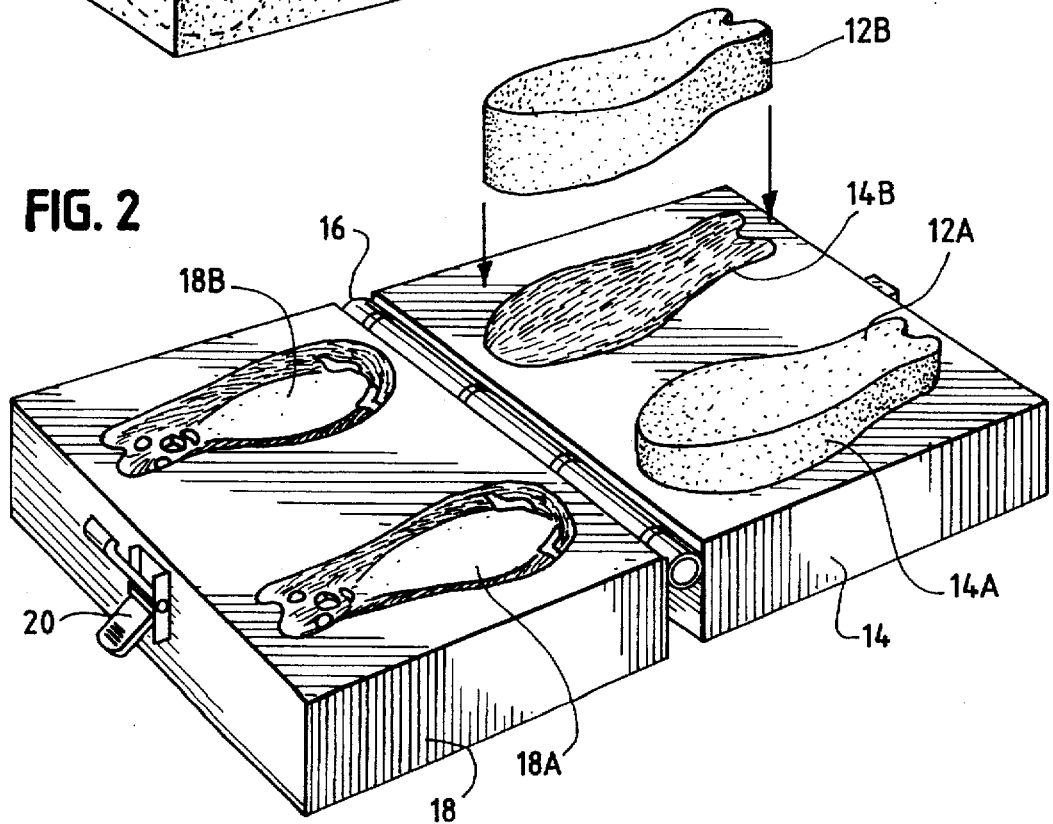
FIG. 2 is a perspective view of a double mold designed to receive two of said blanks.

The molding process of this invention begins with conventional plastic material formed of foamed poly-ethylene (PE) or foamed poly-ethylene vinyl acetate (EVA), both of which are commercially supplied in the form of a flat sheet 10 of uniform thickness (i.e., in the vertical direction, as seen in FIG. 1). The standard commercially available sheet size is 100 cm. by 200 cm.; and the available thicknesses range from 3 to 100 mm., the thickness being substantially uniform across the length and breadth of any particular sheet. The density of such materials is comparable to that of rubber at ordinary ambient temperatures.

Figure 6:
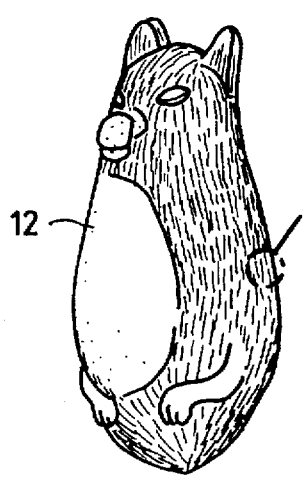
FIG. 6 is a front elevational view of one of the finished molded products.

The objective of the process is to produce a toy or other end product 12 (FIG. 6) which in general has a non-uniform thickness in all dimensions, notwithstanding the uniform thickness of the commercially available sheet stock.

The first step in the process is to die-stamp from the foam sheet 10 one or more mold blanks 12A, B, C, etc. which have an outline roughly congruent with the intended outline of the final product 12. Because the stamping die cuts through the entire thickness (in the vertical direction) of the foam sheet 10, no flash or parting line results from the die-cutting process. In FIG. 1 the first blank 12A is shown after having been lifted out of the foam sheet 10. At this stage of the process, the blanks 12A, B, etc. have the same uniform thickness (in the vertical direction) as the sheet 10 from which they came.

The next step is to put one or more blanks 12A, B, etc. into suitable half cavities such as 14A, B formed in the lower half 14 of a metal mold. Connected to the lower half 14 by hinge 16 is an upper half 18 of the metal mold, which is formed with complementary half cavities 18A, B. After the foam blanks 12A, B, etc. are inserted into the lower cavities 14A, B, the upper half 18 is rotated about the hinge 16 to close the mold, and the mold is then clamped closed by means of a conventional clamping mechanism, part of which is visible at 20.

When the mold is closed, the upper half cavities 18A, B cooperate with the lower half cavities 14A, B to form complete molding cavities which completely enclose the foam blanks 12A, B, etc. The outlines of the upper and lower half cavities are congruent with each other, and with the desired outline of the final product 12.

The concave surfaces of the half cavities have the external surface shapes of the upper and lower portions respectively of the desired final product, and thus serve to mold the blanks 12A, B into products 12 of the desired final shape. That shape will generally have a non-uniform thickness, even though the foam blanks previously were of uniform thickness, like the foam sheet 10 from which they were stamped. In addition, the concave surfaces of the half cavities are engraved with fine surface relief detail which is to be impressed upon the surface of the final product 12.

The closed mold 14, 18, with the foam blanks 12A, B, etc. inside the cavities 14A, 18A and 14B, 18B is then passed through an oven 22 mounted on a table 24. Movement of the molds through the oven may be either intermittent or continuous, and may be accomplished either manually or by means of a conventional automatic conveyer mounted on the table 24. The temperature inside the oven 22 is in the range from 200° to 300° C., and the duration of exposure to the oven temperature is in the range from about 5 to about 15 minutes.

After emerging from the oven, the molds 14, 18, with the foam blanks 12A, B, etc. still inside, are immersed in a vat 26 of cold water 28 for the purpose of quickly chilling the surface of the foam blanks where they contact the concave surfaces of the cavities 14A, 18A and 14B, 18B. The relatively high heat conductance of the metal mold 14, 18 facilitates rapid cooling of the surface layer of the mold blanks 12 where they contact the mold. The temperature of the cooling water is in the range from about 5° to about 20° C., and the duration of exposure to the chilling water is from about 5 to about 15 minutes.

Subsequently the molds 14, 18 are removed from the water bath 28, opened by releasing the clamps 20 and rotating the upper mold half 18 away from the lower mold half 14 about hinge 16, and the molded objects 12 are then removed from the molds and placed in a freezing compartment 30 by inserting the objects 12 through a door 32 and placing them on shelves 34 inside the compartment 30, after which the door 32 is closed. The freezer temperature is from about −5° to about −15° C., and the duration of exposure to the freezing temperature is in the range from about 30 to about 45 minutes.

The EVA foam starting material used in the present invention is classified as "closed cell," which means only that the cells do not connect with each other; the cells do, however, open through the external surface of the sheet 10, making the surface dull-looking and porous. The PE starting material is classified as "open cell," and also has a dull and porous external appearance because of the fact that the cells open through the surface.

The process of this invention produces a substantially lower reject rate than prior processes for molding foam products, which have tended to suffer from irregularities in shape and finish, and incorrect and inconsistent control of softness and density. In addition, prior art products molded from foam materials were characterized by dull and porous surfaces which have defied efforts to apply bright and colorful finishes; those finishes which were applied tended to peel off easily and did not achieve a bright, shiny or colorful effect. The surface detail was also poor.

Figure 7:
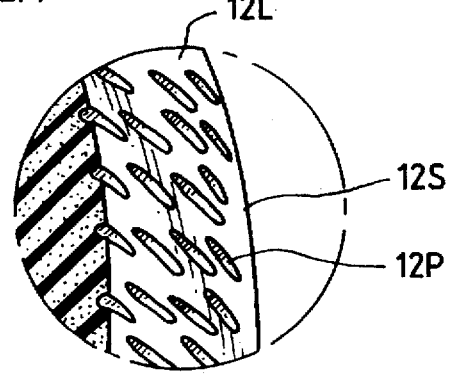
FIG. 7 is an enlarged sectional view of a portion of the surface layer of the finished molded product.

But, as seen in FIG. 7, the result of the successive hot molding, cold quenching and freezing steps of this invention is to create a layer 12L at the surface of the final product 12 in which the cells or pores 12P are sealed and do not open up through the surface of the final product 12. Indeed, the surface now consists of a tough, smooth, impermeable skin 12S, which has substantially the same characteristics as the surface of an injection-molded product: i.e., it is tough, smooth, shiny, durable, and able to receive and hold various types of decorative finishes.

The finished product 12 is also better able to hold molded-in-place inserts, and is less likely to be torn in use. The surface 12S also has a smooth, shiny finish which is inherently more attractive than the dull, porous look of untreated foam materials; which holds fine detail in a way which has not previously been accomplished with foam materials; and which also lends itself to various finishing processes involving bright and decorative colors.

Figure 3:
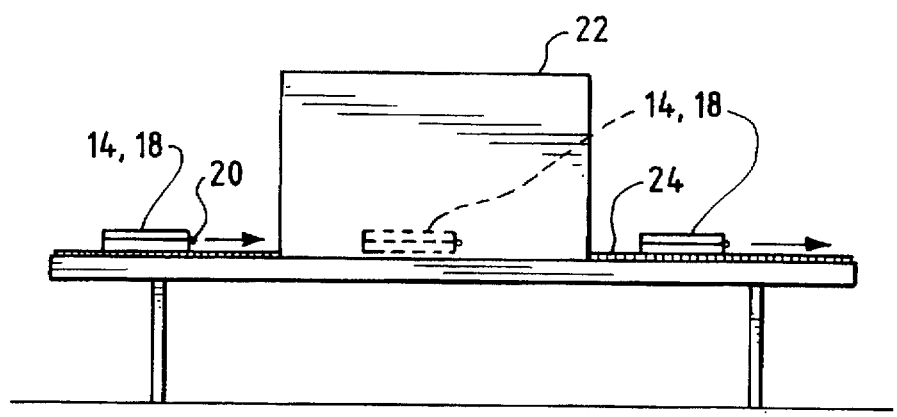
FIG. 3 is an elevational view of a heating chamber through which a number of said molds are passed, thereby molding the blanks into desired objects.
Figure 4:
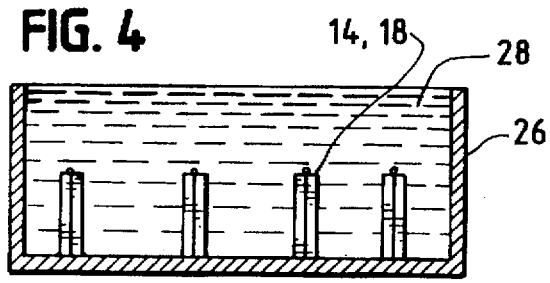
FIG. 4 is a vertical sectional view of a cold-water-filled quenching chamber used for subsequent rapid chilling of said molds with the molded products therein.
Figure 5:
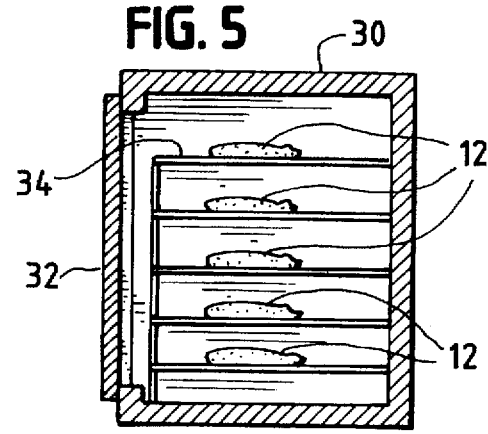
FIG. 5 is a vertical sectional view of a freezer used for subsequently freezing the molded products.

In particular, the finishing processes which have been found to work well in the method of this invention are color die spraying, tampo printing, silk-screening, and the use of a non-porous PE film pre-printed with graphics or a solid color and laminated with a glue which causes the films to adhere to the surface of the product 12. It is a particular feature of the invention that such films can be applied to the mold blank 12 before the heating step of FIG. 3, in which case the film is permanently molded in place on the surface of the product 12.

At the same time, the bulk of the product 12, below the surface layer 12L, retains the original porosity and hence the low density of the original foam sheet 10. As a result, the final product remains soft, light, flexible, and therefore safe for use as a glider, dart toy, bouncing ball, or the like. In addition, the final product 12 can have any desired non-uniform thickness, despite having been formed from a sheet 10 of uniform thickness.

Figure 8:
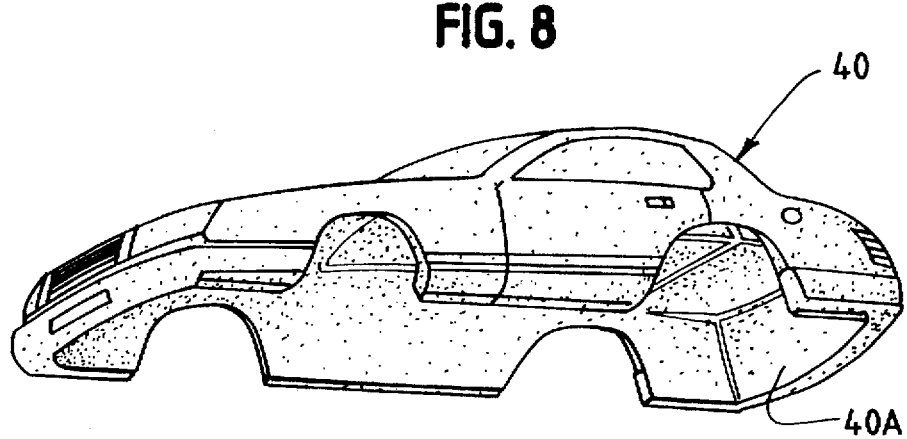
FIG. 8 is a perspective view of another type of finished product which can be made in accordance with the present invention, which is in the form of a hollow shell.
Figure 9:
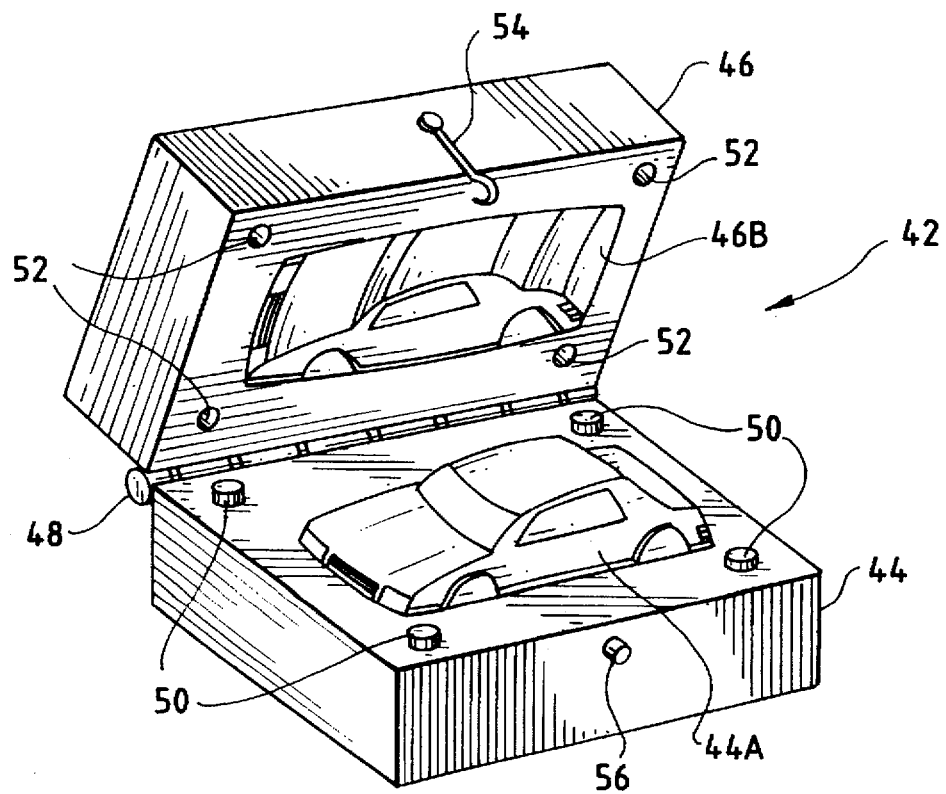
FIG. 9 is a perspective view of a mold used for making the product of FIG. 8 in accordance with this invention.

In accordance with an additional aspect of this invention, it is suitable for molding shapes having the general configuration of a hollow shell, such as the toy car body 40 illustrated in FIG. 8, which features a hollowed-out interior space 40A. This type of configuration is produced by means of the mold 42, which has a lower mold half 44 formed with a convex core 44A and an upper mold half 46 formed with a complementary cavity 46B. A hinge 48, guide pins 50 on the lower mold half 44, complementary guide holes 52 on the upper mold half 46, and a latching mechanism 54, 56 complete the mold assembly.

Figure 10:
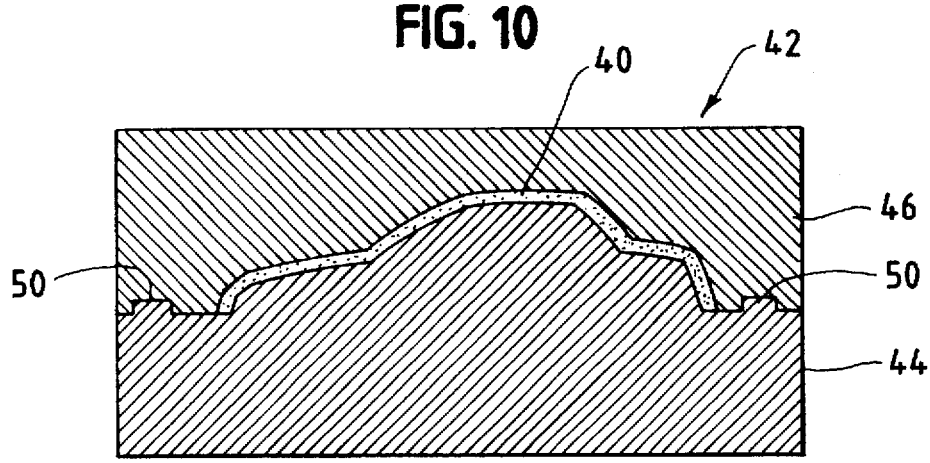
FIG. 10 is a vertical sectional view of the mold of FIG. 9.
Figure 11:
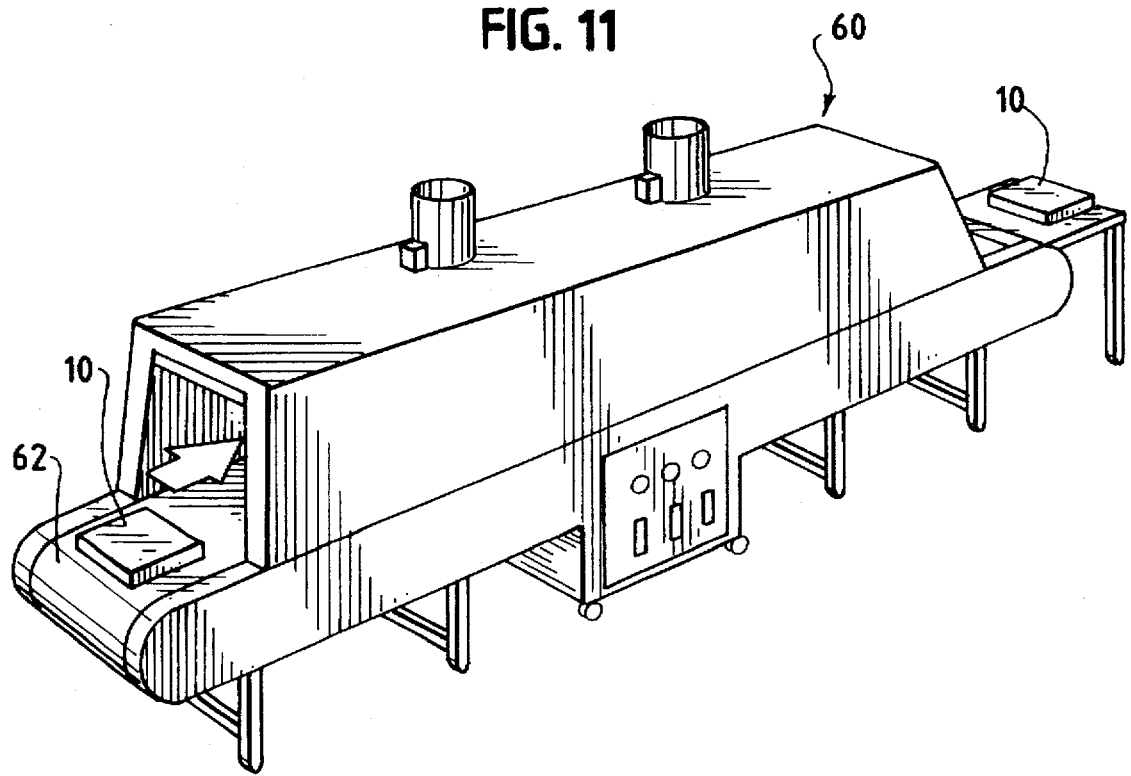
FIG. 11 is a perspective of a conveyer oven used in making the product of FIG. 8.

The sectional view of FIG. 10 illustrates the hollow shell-like shape 40 being formed within the closed mold 42. In order to permit a bulky mass of foam material cut from the sheet 10 to be more easily compressed between the core 44A and cavity 46A for molding purposes, it is preferable to heat the foam material at a temperature of about 200° C. for about 3 to about 5 minutes in order to soften the material before beginning the molding process. For this purpose, an oven 60 (FIG. 11) is provided, and is equipped with a conveyor belt 62 which transports sheets of foam material 10 through the oven prior to their undergoing the process steps described above. Alternatively, this pre-heating procedure may be performed on the foam blanks after they are stamped from the sheet 10; but the stamping is facilitated if the pre-heating step is done first, so that the sheet material 10 is softer at the time the blanks are stamped out.

The ability to mold hollow shell-like configurations as just described opens up the possibility of using the process of this invention to manufacture a wider variety of products, not all of which are toys. For example, inexpensive soft-sided luggage-like containers with attractive exterior finishes may be manufactured in this manner, as well as protective shock-absorbing housings, cases or covers for small electronic appliances, books, and a wide variety of other objects.

Despite somewhat higher raw material costs, the present invention achieves certain significant economies as compared to other molding processes. First, the molds employed in injection molding processes are very expensive. In order to withstand the high temperatures employed in injection molding, the molds must be made of expensive steel; whereas in the present process a much less expensive aluminum alloy material is adequate. In addition, injection molding requires numerous conduits and fittings to conduct the molten plastic resin into the mold cavity; all of which is unnecessary with the process of this invention.

As a result, the mold cost, which can run around $40,000 per cavity for an injection mold, is reduced to the neighborhood of only $2,500 per cavity. This permits the construction of a greater variety of molds for a given cost; which is advantageous generally, but particularly in the toy field because it permits a manufacturer to satisfy consumer desires for greater product variety.

Second, the fact that products manufactured in accordance with this invention can be finished with multi-colored pre-printed PVC film offers a significant saving over other finishing processes requiring more individualized attention to each manufactured piece.

Accordingly, the present invention, in both its process and product aspects, economically produces a flexible, light, shiny, brightly and colorfully finished, durable product of any desired cross-sectional shape. While these features and advantages of the invention have been described in connection with a preferred illustrative embodiment, the scope of protection to which the invention is entitled is to be determined by the appended claims, interpreted in light of the novel principles disclosed herein.

The invention claimed is:

1. A method of molding, from porous material, a low-density product having an impermeable surface, comprising the steps of:
   A. preparing a mold having a cavity the outline of which defines the outline of said product;
   B. stamping from said porous material a blank having substantially the outline of said product;
   C. inserting said blank into said cavity with the outline of said blank substantially congruent with the outline of said cavity;
   D. heating said mold with said blank therein to form said blank permanently into said product;
   E. and then removing said product from said mold and freezing said product;
   the durations and temperatures of said heating and freezing steps being chosen such that an impermeable surface is permanently formed on said product;
   whereby said product has the appearance of having been formed from non-porous material.

2. A method of molding as in claim 1, further comprising the step of rapidly cooling said mold with said product therein between steps D and E.

3. The method of claim 2 wherein said mold is formed of a metallic material, and said step of rapidly cooling comprises immersing said mold in a cold liquid bath.

4. The method of claim 3 wherein said liquid is at a temperature of from 5° to about 20° C.

5. The method of claim 4, wherein the duration of exposure to said liquid is from about 5 to about 15 minutes.

6. The method of claim 2, wherein said freezing step comprises the step of inserting said product into a freezing compartment at a temperature of from about −5° to about −15° C.

7. The method of claim 6, wherein the duration of exposure to the freezing temperature is in the range from about 30 to about 45 minutes.

8. A method in accordance with claim 1 or 2, for molding a product having the general configuration of a hollow shell, wherein said mold further comprises a core adapted to be received within said mold cavity to define said hollow shell configuration, said method comprising the additional step of pre-heating the material of said blank for a sufficient time and at a sufficiently high temperature to soften it prior to its insertion into said mold cavity.

9. A method in accordance with claim 8 wherein said pre-heating step comprises subjecting said material of said blank to a temperature of about 200° C. for a period of from about 3 to about 5 minutes.

10. A method of molding, from a sheet of porous material having a substantially uniform thickness, a low-density product having a non-uniform thickness and an impermeable surface, comprising the steps of:
   preparing a mold having a cavity the thickness and outline of which define the thickness and outline respectively of said product;
   stamping from said sheet a blank of uniform thickness and having substantially the outline of said product;
   inserting said blank into said cavity with the outline of said blank substantially congruent with the outline of said cavity;
   heating said mold with said blank therein to form said blank permanently into said product of non-uniform thickness;
   then rapidly cooling said mold with said product therein;
   and then removing said product from said mold and freezing said product;
   the durations and temperatures of said heating, cooling and freezing steps being chosen such that an impermeable surface is permanently formed on said product;
   whereby said product has the appearance of having been formed from non-porous material.

11. A method of molding a low-density product having an impermeable surface, from a sheet of porous material, comprising the steps of:
   preparing a mold having a cavity which defines said product;
   stamping from said sheet a blank having substantially the outline of said product;
   placing on an external surface of said blank a non-porous plastic film having a decorative coating thereon;
   inserting said blank with said film thereon into said cavity with the outline of said blank substantially congruent with the outline of said cavity;
   heating said mold blank therein to form said blank and said film permanently into the desired product;
   then rapidly cooling said mold with said product therein;
   and then removing said product from said mold and freezing said product;
   whereby said product has the appearance of having been formed from non-porous material.

* * * * *